(12) United States Patent
Lin

(10) Patent No.: US 12,476,898 B2
(45) Date of Patent: Nov. 18, 2025

(54) INFORMATION TRANSMISSION AND DISTRIBUTION TREE ESTABLISHMENT METHODS, APPARATUS, DEVICE, AND STORAGE MEDIUM

(71) Applicant: ZTE CORPORATION, Shenzhen (CN)

(72) Inventor: Zhi Lin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 699 days.

(21) Appl. No.: 17/759,741

(22) PCT Filed: Jun. 22, 2021

(86) PCT No.: PCT/CN2021/101646
§ 371 (c)(1),
(2) Date: Jul. 29, 2022

(87) PCT Pub. No.: WO2021/259292
PCT Pub. Date: Dec. 30, 2021

(65) Prior Publication Data
US 2023/0064407 A1    Mar. 2, 2023

(30) Foreign Application Priority Data

Jun. 24, 2020   (CN) .......................... 202010592444.4

(51) Int. Cl.
| H04L 45/16 | (2022.01) |
| H04L 12/18 | (2006.01) |
| H04L 45/48 | (2022.01) |

(52) U.S. Cl.
CPC .............. *H04L 45/16* (2013.01); *H04L 12/18* (2013.01); *H04L 45/48* (2013.01)

(58) Field of Classification Search
CPC ......... H04L 45/16; H04L 12/18; H04L 45/48; H04L 45/34; H04L 45/04; H04L 45/484; H04W 8/24
See application file for complete search history.

(56) References Cited

U.S. PATENT DOCUMENTS

| 6,553,423 | B1 | 4/2003 | Chen |
| 2007/0076703 | A1* | 4/2007 | Yoneda ............... H04L 12/1836 370/389 |

(Continued)

FOREIGN PATENT DOCUMENTS

| CN | 101155135 A | 4/2008 |
| CN | 101989952 A | 3/2011 |

(Continued)

OTHER PUBLICATIONS

European Patent Office. Extended European Search Report for EP Application No. 21830246.1, mailed Jul. 14, 2023, pp. 1-11.
Rosen, E., et al. "Multicast in MPLS/BGP IP VPNs," Internet Engineering Task Force, Feb. 2012, pp. 1-88.
Asghar, et al. "Explicit Reverse Path Forwarding (RPF) Vector," Internet Engineering Task Force Standards Track, Jun. 2016, pp. 1-9.

(Continued)

*Primary Examiner* — Rina C Pancholi
(74) *Attorney, Agent, or Firm* — Vivacqua Crane, PLLC

(57) ABSTRACT

A method and apparatus for sending information, a method and apparatus for establishing a distribution tree, a device, and a storage medium are disclosed. The method for sending information may include: determining a processing capability of a present node for a joining attribute of a multicast joining message; and announcing information about the processing capability for the joining attribute of the multicast joining message to a network, where the information about the processing capability for the joining attribute of the multicast joining message is configured to indicate the processing capability of the present node for the joining attribute carried in the multicast joining message.

15 Claims, 6 Drawing Sheets

Determine a processing capability of a present node for a joining attribute of a multicast joining message — S11

Announce information about the processing capability for the joining attribute of the multicast joining message to a network, where the information about the processing capability for the joining attribute of the multicast joining message is configured to indicate the processing capability of the present node for the joining attribute carried in the multicast joining message — S12

(56) References Cited

U.S. PATENT DOCUMENTS

| | | | |
|---|---|---|---|
| 2009/0161594 A1* | 6/2009 | Zhu | H04L 12/18 370/312 |
| 2011/0286450 A1* | 11/2011 | Wijnands | H04L 45/04 370/390 |
| 2012/0075988 A1 | 3/2012 | Lu et al. | |
| 2012/0327764 A1* | 12/2012 | Han | H04L 12/185 370/219 |
| 2014/0169366 A1 | 6/2014 | Kotalwar et al. | |
| 2014/0204939 A1 | 7/2014 | Kotalwar et al. | |
| 2017/0317841 A1* | 11/2017 | Xu | H04L 45/745 |
| 2019/0007225 A1 | 1/2019 | Nagarajan et al. | |

FOREIGN PATENT DOCUMENTS

| | | |
|---|---|---|
| CN | 105429878 A | 3/2016 |
| CN | 109150580 A | 1/2019 |
| EP | 3422632 A1 | 1/2019 |
| KR | 20140001882 A | 1/2014 |
| KR | 20150100875 A | 9/2015 |

OTHER PUBLICATIONS

Boers, et al. "The Protocol Independent Multicast (PIM) Join Attribute Format," Internet Engineering Task Force Network Working Group, Nov. 2008, pp. 1-10.

International Searching Authority. International Search Report and Written Opinion for PCT Application No. PCT/CN2021/101646 and English translation, mailed Sep. 9, 2021, pp. 1-10.

Lei, et al. "Inter-domain multicast and inter-domain improvement of PIM-SM," Microcomputer Applications, vol. 19, No. 9, 2003, pp. 54-56.

The State Intellectual Property Office of People's Republic of China. First Office Action for CN Application No. 202010592444.4 and English translation, mailed Jun. 26, 2024, pp. 1-10.

The State Intellectual Property Office of People's Republic of China. First Search Report for CN Application No. 202010592444.4 and English translation, mailed Jun. 25, 2024, pp. 1-6.

Korean Intellectual Property Office. First Office Action for KR Application No. 10-2022-7026061 and English translation, mailed Nov. 23, 2023, pp. 1-13.

* cited by examiner

INFORMATION TRANSMISSION AND DISTRIBUTION TREE ESTABLISHMENT METHODS, APPARATUS, DEVICE, AND STORAGE MEDIUM

CROSS-REFERENCE TO RELATED APPLICATION

This application is a national stage filing under 35U.S.C. § 371 of international application number PCT/CN2021/101646, filed Jun. 22, 2021, which claims priority to Chinese patent application No. 202010592444.4 filed Jun. 24, 2020. The contents of these applications are incorporated herein by reference in their entirety.

TECHNICAL FIELD

The present disclosure relates to the technical field of communication, and in particular, to a method and apparatus for sending information, a method and apparatus for establishing a distribution tree, a device, and a storage medium.

BACKGROUND

Discovery messages of Protocol Independent Multicast (PIM) are single-hop multicast messages, so only routers connected to the identical link can discover each other's capabilities to process joining attributes, that is, neither a controller nor a router in a network can perceive and determine which routers in a local routing area support or do not support processing joining attributes. At present, when using joining attributes, a network administrator needs to manually calculate and fill in the specific information, so there are some problems, such as poor flexibility, inability of responding to changes in network topology or changes in router capability in time and the like.

SUMMARY

In accordance with an aspect of the present disclosure, an embodiment provides a method for sending information, the method may include: determining a processing capability of a present node for a joining attribute of a multicast joining message; and announcing information about the processing capability for the joining attribute of the multicast joining message to a network, where the information about the processing capability for the joining attribute of the multicast joining message is configured to indicate the processing capability of the present node for the joining attribute carried in the multicast joining message.

In accordance with an aspect of the present disclosure, an embodiment provides a method for establishing a distribution tree, the method may include: receiving information about processing capabilities of each node for a joining attribute of a multicast joining message; and establishing a multicast distribution tree based on the information about the processing capabilities of each node for the joining attribute of the multicast joining message.

In accordance with an aspect of the present disclosure, an embodiment provides an apparatus for sending information, the apparatus may include: a sending module configured to determine a processing capability of a present node for a joining attribute of a multicast joining message; and announce information about the processing capability for the joining attribute of the multicast joining message to a network, where the information about the processing capability for the joining attribute of the multicast joining message is configured to indicate the processing capability of the present node for the joining attribute carried in the multicast joining message.

In accordance with an aspect of the present disclosure, an embodiment provides an apparatus for establishing a distribution tree, the apparatus may include: a receiving module, configured to receive information about processing capabilities of each node for a joining attribute of a multicast joining message; and an establishment module, configured to establish a multicast distribution tree based on the information about the processing capabilities of each node for the joining attribute of the multicast joining message.

In accordance with an aspect of the present disclosure, an embodiment provides a device, the device may include: one or more processors; and a memory storing one or more programs which, when executed by the one or more programs, cause the one or more processors to perform any one of the methods in embodiments of the present disclosure.

In accordance with an aspect of the present disclosure, an embodiment provides a storage medium storing a computer program which, when executed by a processor, causes the processor to perform any one of the methods in embodiments of the present disclosure.

DETAILED DESCRIPTION

Figure 1:
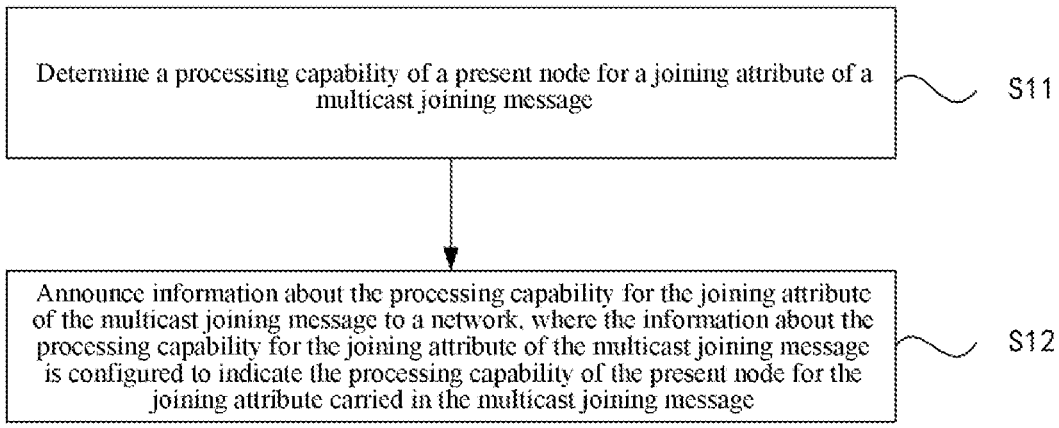
FIG. 1 is a flowchart of a method for sending information provided according to an embodiment of the present disclosure.

Embodiments of the present disclosure provide a method and apparatus for sending information, a method and apparatus for establishing a distribution tree, a device, and a storage medium, to implement that a controller or a router in a network perceives and determines which routers in a local routing area support or do not support processing joining attributes, thereby automatically establishing a multicast distribution tree meeting specific requirements.

In order to make the objects, technical schemes and advantages of the present disclosure clearer, embodiments of the present disclosure will be described in detail with reference to the accompanying Drawings. It should be noted that the embodiments in the present disclosure and the features in the embodiments may be combined with each other if not conflicted.

The steps shown in the flowcharts of the accompanying Drawings may be executed in a computer system, such as a set of computer-executable instructions. Moreover, although a logical sequence is shown in the flowchart, in some cases, the steps shown or described may be performed in a different sequence from that here.

Firstly, the concepts involved in a multicast technology are briefly described.

The multicast technology provides efficient point-to-multipoint traffic transmission. At present, the mainstream Protocol Independent Multicast (PIM) helps to establish a multicast distribution tree with a multicast source or a rendezvous point as a root, and traffic receivers as leaves. The traffic flows from the root to the leaves along the multicast distribution tree, and reaches a plurality of receivers only when a branch node is replicated. In a multicast network, a network device connected to a multicast traffic receiver is called a last-hop router, a network device connected to the multicast source is called a source router, and a network device where the rendezvous point is located is called a rendezvous point router. A multicast router announces three-layer multicast capabilities by exchanging discovery messages of the PIM on an interface link and establishes multicast neighbors. In a unicast routing table, an outgoing interface to the source or rendezvous point and a next-hop device are called a reverse path forwarding interface to the source or rendezvous point and a multicast upstream neighbor respectively. The last-hop router establishes a multicast distribution tree by utilizing a joining message to the source or rendezvous point in the PIM, and the last-hop router sends a multicast joining message to its multicast upstream neighbor, the upstream neighbor then forwards the joining message to its upstream neighbor until the joining message finally reaches a designated source router or rendezvous point router, thus establishing the multicast distribution tree from the leaves to the root. Multicast traffic is propagated on the multicast distribution tree in a direction from the root to the leaves, and the multicast traffic received by any multicast router on a non-reverse path forwarding interface is discarded to prevent loop and duplicate traffic. The multicast router propagates the traffic received from the reverse path forwarding interface to a downstream outgoing interface.

The basic multicast distribution tree establishment only depends on the unicast routing to the source or rendezvous point, however, with the emergence of a new application scenario, the protocol allows a joining attribute field to be carried in the joining message, the field affecting the establishment of the multicast distribution tree. For example, in a routing area, border routers are connected to external areas, a core router is configured to connect the border routers, and the external routing information is directly transmitted between the border routers. That is, the core router only has routing information to each border router without learning external routing information, so as to reduce the burden of the core router. When the multicast source/rendezvous point and receiver are respectively in the external areas connected to different border routers, there is a problem in establishing a multicast distribution tree across the core area, i.e., multicast upstream neighbors cannot be determined because the routers in the core area do not have unicast routing to the external multicast source/rendezvous point. To solve this problem, the protocol defines a joining attribute of a Reverse Path Forwarding Vector (RPF Vector), the vector indicating an address of the border router connected to the multicast source/rendezvous point. After receiving the joining message with the joining attribute of the RPF vector, the core router no longer calculates a multicast upstream neighbor for the multicast source/rendezvous point, but calculates a multicast upstream neighbor with the boundary router indicated by the vector as a target, and establishes a multicast distribution tree with a border gateway router connected to the multicast source/rendezvous point as the root and border gateway routers connected to the receivers as the leaves. For another example, some multicast applications need active-active elastic protection to ensure high-reliability transmission, that is, the last-hop router receives traffic from two independent multicast distribution trees simultaneously. The last-hop router forwards the traffic received from a primary multicast distribution tree to the receivers when a transmission network is normal, and discards the traffic received from a standby multicast distribution tree; and the last-hop router starts to forward the traffic received from the standby multicast distribution tree when the traffic cannot be received from the primary multicast distribution tree due to network failure. This requires that the paths of the primary and standby multicast distribution trees are independent of each other, and have no intersecting point to avoid the simultaneous failure of the primary and standby multicast distribution trees caused by single point failure. The protocol redefines the joining attribute of the Explicit RPF Vector for establishing the standby multicast distribution tree. The attribute carries the information about each hop from the leaves to the root on the standby multicast distribution tree. The router receives a multicast joining message with the joining attribute of the Explicit RPF Vector, does not need to calculate the multicast upstream neighbor for the multicast source/rendezvous point, but directly sends the joining message according to the upstream neighbor indicated by this attribute.

Carrying the joining attribute in the multicast joining message helps to establish a multicast distribution tree with special requirements. However, this requires that each router which receives the joining message with the joining attribute has capabilities to process the attribute to prevent loops. If a certain router without processing capabilities ignores the joining attribute originally indicating the multicast upstream neighbor after receiving the joining message with the joining attribute, and uses the multicast source/rendezvous point to calculate the multicast upstream neighbor, it is possible to send the joining message back to the router that has been previously passed. For this reason, the discovery messages of the PIM will expand the announcement carrying the capabilities to process the joining attribute. When the router finds that its multicast upstream neighbor does not support processing the joining attribute, the joining attribute of the multicast joining message sent to the upstream neighbor must be removed first. However, there are still some problems in application. Discovery messages of the PIM are single-hop multicast messages, so only routers connected to the identical link can discover each other's capabilities to process joining attributes, that is, neither a controller nor a router in a network can perceive and determine which routers in a local routing area support or do not support processing joining attributes. By taking the joining attribute of the Explicit RPF Vector providing active-active elastic protection as an example, the current method is that the network administrator manually calculates a standby multicast distribution tree that does not intersect with the primary multicast distribution tree and each hop device can support the joining attribute, and then manually fills in the detailed information about the joining attribute of the Explicit RPF Vector. Obviously, manual participation has the problems of poor flexibility, inability of responding to changes in network topology or changes in router capability in time, low scalability, heavy computational burden when multiple multicast applications need active-active elastic protection, prone occurrence of errors and the like.

In view of the problems of poor flexibility, low scalability, and prone occurrence of errors due to the fact that manual participation is required when establishing a multicast distribution tree which is not only aimed at the unicast routing of the multicast source/rendezvous point since neither the network controller nor the router can acquire the processing capabilities of other routers in the local routing area except the directly connected routers for the joining attribute of the multicast joining message, a method is provided in which a unicast link state protocol is adopted to describe the processing capabilities of a router for a joining attribute of a multicast joining message and announce in a routing area, each router participating in the link state protocol is capable of mastering the processing capabilities of other routers in the routing area for the joining attribute of the multicast joining message; and the Border Gateway Protocol-Link State (BGP-LS) is adopted to encode the description information about the processing capabilities of the link state protocol for the joining attribute of the multicast joining message and announce to the controller, so that the controller can master the capabilities of all routers in the network. The router and controller learn the capabilities of all routers in the routing area, thereby dynamically calculating the multicast distribution tree paths that meet requirements.

In an embodiment, the present disclosure provides a method for sending information. As shown in FIG. 1, the information sending method provided by the embodiment of the present disclosure includes steps S11 and S12.

At S11, a processing capability of a present node for a joining attribute of a multicast joining message is determined.

At S12, information about the processing capability for the joining attribute of the multicast joining message is announced to a network, where the information about the processing capability for the joining attribute of the multicast joining message is configured to indicate the processing capability of the present node for the joining attribute carried in the multicast joining message.

In an embodiment, the above method for sending information is executed by each node in the routing area.

In an embodiment, nodes refer to all routing devices in one routing area. It should be noted that the nodes, devices and routers in this embodiment are all routing devices in the routing area.

The information about the processing capability for the joining attribute of the multicast joining message may be understood as information indicating whether a node has the capabilities to process the joining attribute of the multicast joining message or whether the node supports the joining attribute of the multicast joining message.

In an embodiment, if the information about the processing capability for the joining attribute of the multicast joining message carries a processing capability identifier for the joining attribute of the multicast joining message, it is indicated that the present node has the processing capability for the joining attribute of the multicast joining message. If the information about the processing capability for the joining attribute of the multicast joining message does not carry a processing capability identifier for the joining attribute of the multicast joining message, it is indicated that the present node does not have the processing capability for the joining attribute of the multicast joining message.

Further, in this embodiment, the processing capability identifier for the joining attribute of the multicast joining message may be a newly defined Type-Length-Value (TLV) field or a newly defined flag bit in an existing link state protocol router capability object. That is, if the TLV field exists, it is indicated that the node has the processing capability for the joining attribute carried in the multicast joining message, and if the TLV field does not exist, it is indicated that the node does not have the processing capability for the joining attribute carried in the multicast joining message. Alternatively, if the newly defined flag bit in the link state protocol router capability object is set to 1, it is indicated that the node has the processing capability for the joining attribute carried in the multicast joining message, and if the newly defined flag bit is set to 0, it is indicated that the node does not have the processing capability for the joining attribute carried in the multicast joining message. It should be noted that, in this embodiment, the processing capability identifier for the joining attribute of the multicast joining message is only described, but is not limited.

In an embodiment, the information about the processing capability for the joining attribute of the multicast joining message further includes a subtype of a joining attribute of a multicast joining message supported by the present node.

In an embodiment, since the joining attribute may have multiple subtypes, the functions of different subtypes are different, and the required processing methods are also different, subtypes capable of being supported by the device currently may be optionally carried under the information about the processing capability for the joining attribute of the multicast joining message. If there are announced subtypes of the joining attribute supported by the node under the router capability information, it means that the router can only recognize and process the subtypes that are announced, but cannot process the subtypes that are not announced. If there are not announced subtypes of the joining attribute supported by the node under the router capability information, it means that the router can support processing any subtype of joining attribute of the multicast message by default.

In an embodiment, the information about the processing capability for the joining attribute of the multicast joining message is carried in router capability information of a link state protocol (IGP), or the information about the processing capability for the joining attribute of the multicast joining message is carried in the community attribute information of information border gateway protocol-link state (BGP-LS) routing.

In an embodiment, the method further includes: updating the information about the processing capability for the joining attribute of the multicast joining message in the IGP and the BGP-LS when the processing capabilities of the node for the multicast joining attribute change.

In an embodiment, updating the information about the processing capability for the joining attribute of the multicast joining message includes one or more of the following: updating the processing capability identifier for the joining attribute of the multicast joining message; or updating the subtype of the joining attribute supported by the node.

In an embodiment, updating a processing capability identifier for the joining attribute of the multicast joining message includes: deleting the processing capability identifier for the joining attribute of the multicast joining message, or adding the processing capability identifier for the joining attribute of the multicast joining message.

Updating subtypes of the joining attribute supported by the node includes: newly adding the subtypes of the joining attribute supported by the node, or reducing the subtypes of the joining attribute supported by the node.

It should be noted that, in this embodiment, the subtypes of the joining attribute supported by the node have integrity. That is, if the support capability of the router for the previous subtype of the joining attribute changes, all the subtypes of the joining attribute currently supported must be announced together, and incremental announcement is not allowed, that is, it is not allowed to only announce the changed subtype.

Figure 2:
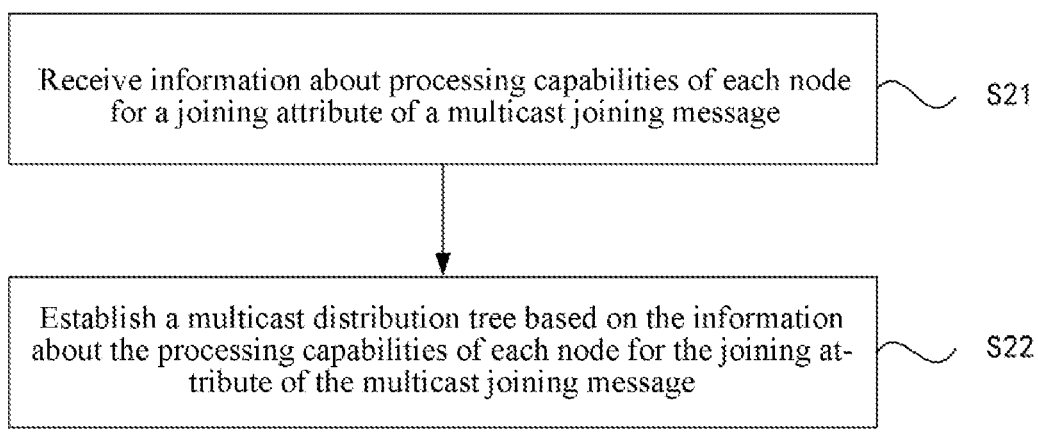
FIG. 2 is a flowchart of a method for establishing a distribution tree provided according to an embodiment of the present disclosure.

In an embodiment, the present disclosure provides a method for establishing a distribution tree. As shown in FIG. 2, the method for establishing a distribution tree provided by the embodiment of the application includes steps S21 and S22.

At S21, information about processing capabilities of each node for a joining attribute of a multicast joining message is received.

At S22, a multicast distribution tree is established based on the information about the processing capabilities of each node for the joining attribute of the multicast joining message.

In an embodiment, the receiving information about processing capabilities of each node for a joining attribute of a multicast joining message includes: receiving information about the processing capabilities of each node for the joining attribute of the multicast joining message announced in the IGP or the BGP-LS.

In an embodiment, establishing a multicast distribution tree based on the information about the processing capabilities of each node for the joining attribute of the multicast joining message includes: retaining a node that meets a preset condition in an original network topology to form a new network topology, where the preset condition is determined by the information about the processing capability for the joining attribute of the multicast joining message; and establishing a multicast distribution tree on the new network topology.

In an embodiment, the node that meets the preset condition includes one or more of the following: a node that only has processing capability identifier for the joining attribute of the multicast joining message and do not carry any subtype; or a node that has processing capability identifier for the joining attribute of the multicast joining message and carries a subtype including a required specific subtype.

In this embodiment, the nodes that do not have the capabilities to process the joining attribute of the multicast joining message, the nodes that have announced the detailed subtypes of the joining attribute but haven't announced the required specific subtypes, and the connections of these nodes are deleted from the original network topology, and a branch path of the standby multicast distribution tree to the multicast source/rendezvous point is calculated on the remaining network topology information.

In addition, it should be noted that when the capabilities of a router for the joining attribute in the network changes, recalculation of the multicast distribution tree may be triggered.

Figure 3:
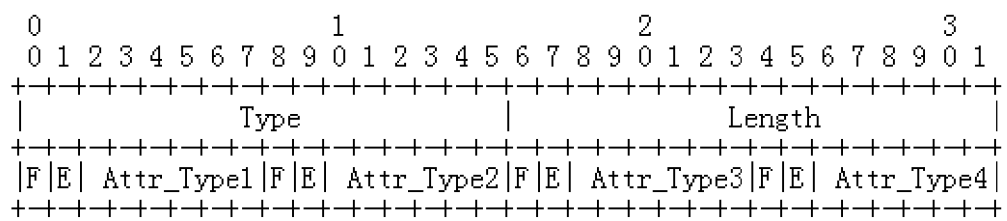
FIG. 3 is a diagram of a structure of information for announcing processing capabilities for a joining attribute of a multicast joining message in the IGP and the BGP-LS according to an embodiment of the present disclosure.

In an applicable embodiment, a structure of information for announcing the processing capability for the joining attribute of the multicast joining message in the link state protocol and border gateway protocol-link state is provided. FIG. 3 is a diagram of a structure of information for announcing the processing capabilities for a joining attribute of a multicast joining message provided by an embodiment of the present disclosure.

As shown in FIG. 3, in the link state protocol, a processing capability identifier for the joining attribute of the multicast joining message is added into the router capability information. The Type field represents that the joining attribute is supported. The Length represents the total length of multiple subtypes of the joining attribute carried later. The Attribute-Type represents the subtype of the specific joining attribute; The F bit indicates whether unvarnished transmission is acceptable. This bit is only meaningful when the multicast module of the router processes the specific joining attribute of the multicast joining message. Therefore, the F bit is set to 0 during link state protocol capability announcement, and ignored and treated as 0 during reception. The E bit in the joining attribute represents that this Attribute-Type is the last joining attribute subtype carried in the multicast joining message. However, there is a Length field in the link state protocol that indicates the total number of Attribute-Type subtypes, so the E bit is set to 0 during capability announcement and ignored during reception.

If the link state protocol does not carry a specific joining attribute subtype when announcing the capabilities for the joining attribute of the multicast joining message, the Length field is filled with 0, which means that the router may process any subtype.

When the capability of the router changes, the router no longer supports some previously announced joining attribute subtypes, or starts to support new subtypes. In the link state protocol, the router should re-announce all the currently supported joining attribute subtypes together. After receiving the router capability information that the subtypes of the joining attribute of the multicast joining message sent by other routers are changed, the capability information about corresponding routers needs to be updated.

In the border gateway protocol-link state, when network layer reachability information of node type describing link state protocol node information is generated, a community attribute for describing the processing capability for the joining attribute of the multicast joining message is added.

In an embodiment, the method adopting the link state protocol and the border gateway protocol-link state to announce the information about capabilities of the network device to process the joining attribute of the multicast joining message in the present disclosure includes the following procedures.

A link state protocol module acquires the information about processing capabilities of a local multicast function for the joining attribute to the multicast joining message, and announces joining attribute information in the router capability information of the link state protocol.

The joining attribute information may be understood as the expression in the link state protocol of whether the router has the capabilities to process the joining attribute of the multicast joining message. The link state protocol includes: Open Shortest Path First (OSPF) and Intermediate System to Intermediate System (IS-IS).

Since the joining attribute of the multicast joining message may have multiple subtypes, different subtypes have different functions, and the required processing methods are also different, the supported joining attribute subtypes may be carried in more detail under the router capability information. If there are announced detailed types, it means that the router can only recognize and process the subtypes that are announced, but cannot process the subtypes that are not announced; and if there are not announced detailed types, it means that the router may support processing any subtype of joining attribute by default.

The subtypes of the joining attribute of the multicast joining message announced by the link state protocol have integrity. That is, if the processing capability of the router for the previous subtype of the joining attribute changes, all the subtypes of the joining attribute currently supported must be announced together, and incremental announcement is not allowed.

In the border gateway protocol-link state, when network layer reachability information of node type is generated, a community attribute for describing the information about processing capabilities of the router for the joining attribute of the multicast joining message is added.

Routers within the information spread range of the link state protocol and controllers connected by the border gateway protocol-link state can accurately know how each router in the network processes the joining attribute of the multicast joining message. When establishing a multicast distribution tree that does not only aim at the unicast routing of the multicast source/rendezvous point, the controller or the last-hop router takes the capabilities of the network device to support the joining attribute as limiting conditions according to the application requirements, and calculates the multicast upstream neighbor or complete path only between the routers that announce supporting the joining attribute subtype explicitly or announce supporting all attribute types by default.

Compared with related technologies, the present disclosure adopting the link state protocol and border gateway protocol-link state to announce the capabilities of the network device to process the joining attribute of the multicast joining message has the advantages that the controller and router can accurately master how each router in the network supports the processing capability for the joining attribute of the multicast joining message, the controller or the last-hop router may perform dynamic calculation when establishing a multicast distribution tree that does not only aim at the unicast routing of the multicast source/rendezvous point, and actively avoids routers that do not support adding extended features, so the flexibility and scalability may be improved without manual participation.

Figure 4:
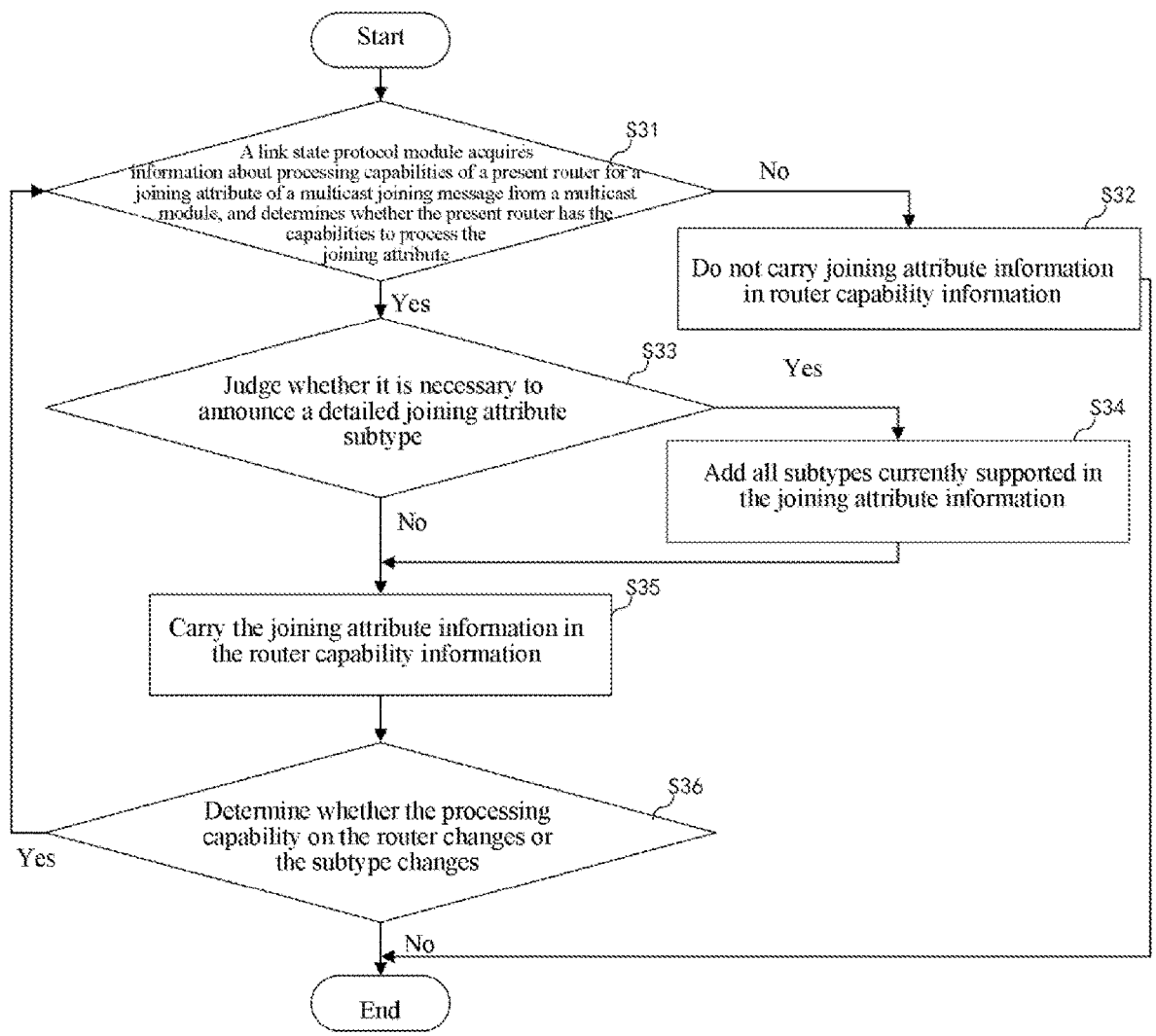
FIG. 4 is a flowchart of a method for announcing processing capabilities for a joining attribute of a multicast joining message provided according to an embodiment of the present disclosure.

In one applicable example, a method for announcing processing capabilities for a joining attribute of a multicast joining message is provided. FIG. 4 is a flowchart of an announcing method provided in the present disclosure.

As shown in FIG. 4, the method for announcing processing capabilities for a joining attribute of a multicast joining message mainly includes steps S31, S32, S33, S34, S35, and S36.

At S31, a link state protocol module acquires information about processing capabilities of a present router for a joining attribute of a multicast joining message from a multicast module, and determines whether the present router has the capabilities to process the joining attribute; if no, S32 is executed; if yes, S33 is executed.

At S32, joining attribute information is not carried in router capability information.

At S33, it is judged whether a detailed joining attribute subtype is necessary to be announced; if no, S35 is executed; if yes, S34 is executed.

At S34, all subtypes currently supported are added in the joining attribute information.

At SS35, the joining attribute information is carried in the router capability information.

If the subtype information is not carried, it is indicated that the router may support any subtype.

At S36, it is determined whether the processing capability on the router changes or the subtype changes, and if one of the two changes, return to S31 to refresh the joining attribute information announcement.

Figure 5:
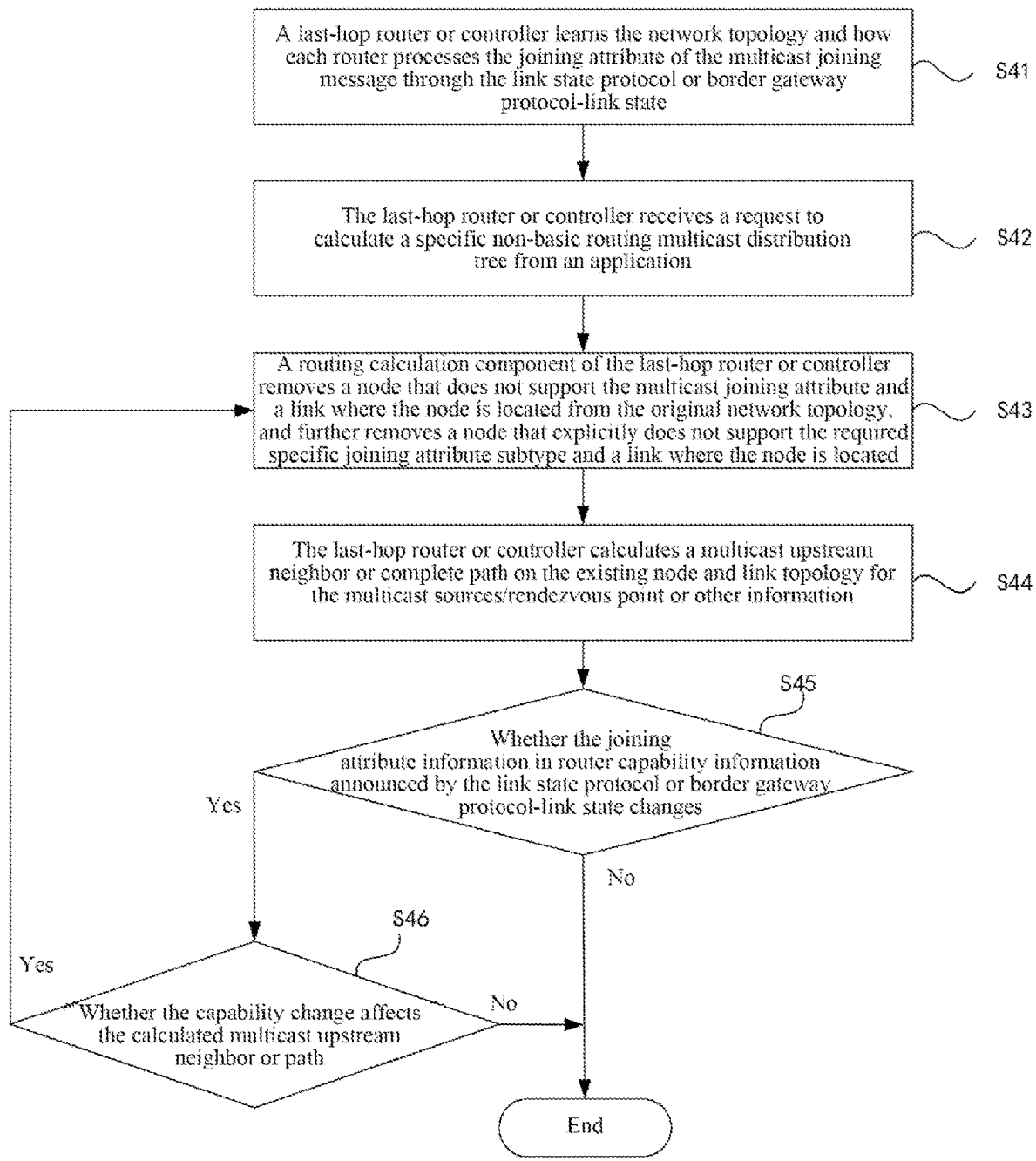
FIG. 5 is a flowchart of a method for dynamically determining a multicast distribution tree based on information about processing capabilities of each node in a network for a joining attribute of a multicast joining message provided according to an embodiment of the present disclosure.

In one applicable example, a process about how to utilize each router to process information about a joining attribute of a multicast joining message to perform dynamic calculation is provided. As shown in FIG. 5, a method for dynamically determining a multicast distribution tree based on the joining attribute information mainly includes steps S41, S42, S43, S44, S45, and S46.

At S41, a last-hop router or controller learns the network topology and how each router processes the joining attribute of the multicast joining message through the link state protocol or border gateway protocol-link state.

At S42, the last-hop router or controller receives a request to calculate a specific non-basic routing multicast distribution tree from an application.

At S43, a routing calculation component of the last-hop router or controller removes a node that does not support the multicast joining attribute and a link where the node is located from the original network topology, and further removes a node that explicitly does not support the required specific joining attribute subtype and a link where the node is located.

At S44, the last-hop router or controller calculates a multicast upstream neighbor or complete path on the existing node and link topology for the multicast sources/rendezvous point or other information.

At S45, it is determined whether the joining attribute information in router capability information announced by the link state protocol or border gateway protocol-link state changes; if no, nothing is done; if yes, S46 is executed.

At S46, it is judged whether the capability change affects the calculated multicast upstream neighbor or path; if no, nothing is done; if yes, return to S43.

For example, the active-active elastic protection relies on the attribute of the Explicit RPF Vector of the subtype of the joining attribute of the multicast joining message to establish a standby-path multicast distribution tree, and each router in the routing area that supports the subtype of the joining attribute of the Explicit RPF Vector announces in the subtype of the joining attribute of the router capability information of the link state protocol. If the router capability information of the link state protocol only announces supporting the joining attribute but does not carry any detailed subtypes, it may be regarded as supporting all subtypes by default; if there is no announced joining attribute in the router capability information, or the announced joining attribute carries other detailed subtypes but does not contain Explicit RPF Vector subtypes, it means that the router does not support processing the multicast joining message with the joining attribute of the Explicit RPF Vector, so the routers that do not have capabilities to process the subtypes of the joining attribute of the Explicit RPF Vector should be excluded when calculating the standby multicast distribution tree with active-active elastic protection.

The last-hop router adopts a traditional calculation method to calculate the primary multicast distribution tree, that is, uses a shortest path spanning tree algorithm of the link state protocol to find the multicast upstream neighbors to the multicast source/rendezvous point in the whole routing area without considering the processing capabilities of all routers in the routing area for the joining attribute.

When calculating the standby multicast distribution tree that does not intersect with the primary multicast distribution tree, the constrained shortest path spanning tree algorithm is adopted. The constraint condition is to delete the nodes and links that the primary multicast distribution tree passes through from the original network topology first, and then delete the nodes that do not have the capabilities to process the joining attribute of the multicast joining message, the nodes that announce detailed joining attribute subtypes but do not carry Explicit RPF Vector subtypes, and all the connections of these nodes, and run the shortest path spanning tree algorithm on the remaining network topology information to find a branch path of the standby multicast distribution tree to the multicast source/rendezvous point.

Figure 6:
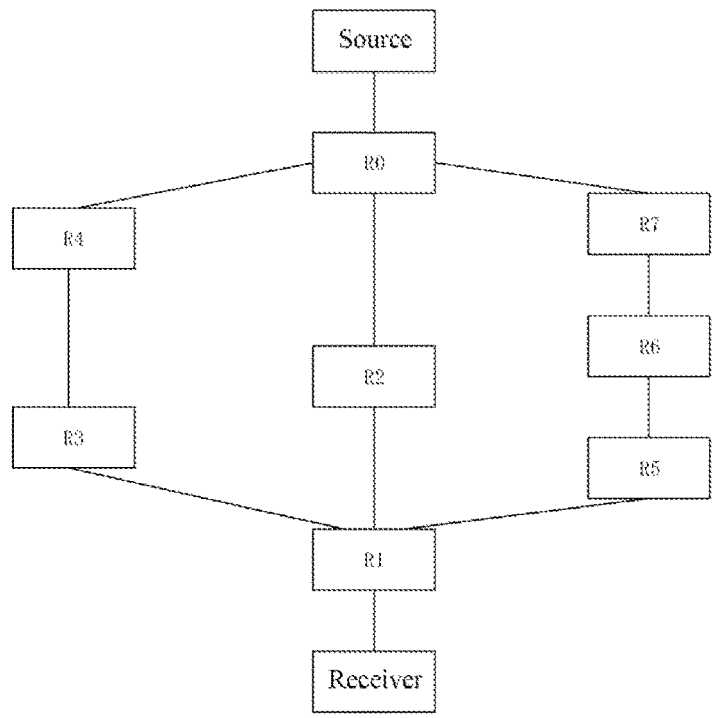
FIG. 6 is a schematic diagram of an original topology of a multicast distribution tree with a standby path with active-active elastic protection established according to an embodiment of the present disclosure.
Figure 7:
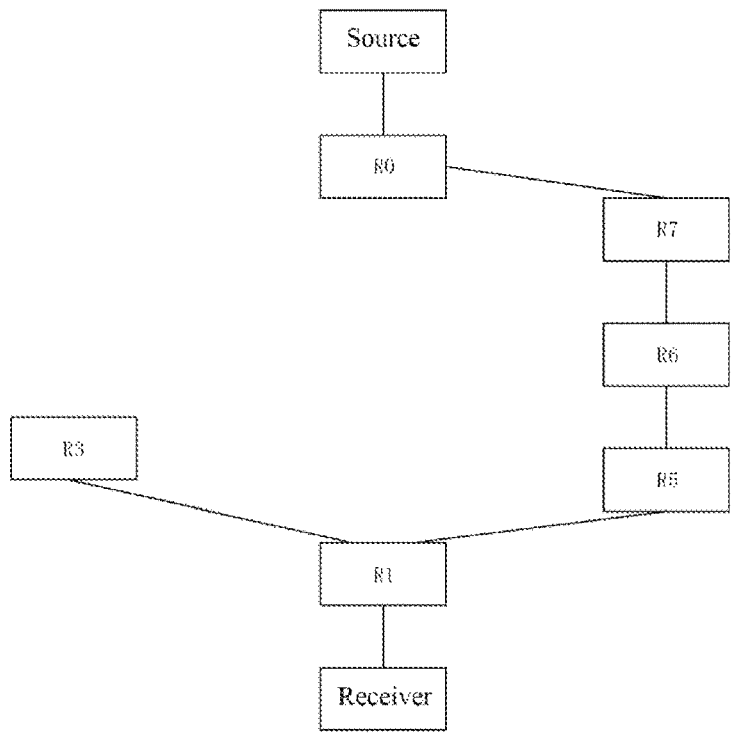
FIG. 7 is a schematic diagram of a topology of a standby path with active-active elastic protection established according to an embodiment of the present disclosure after being cut based on processing capabilities for a joining attribute of a multicast joining message.

In one implementation, the cost of each link is equal, and a router R4 does not support the joining attribute of the multicast joining message. Routers R0, R1, R2, R3, R5, R6 and R7 all support the joining attribute of the multicast joining message, as shown in FIG. 6. By taking the standby multicast distribution tree with active-active elastic protection as an example, in the original network topology, the last-hop router R1 calculates the shortest path to the source router R0 as the primary multicast distribution tree, and the calculation result is R1-R2-R0, i.e., the path from the receiver to the source. When calculating the standby multicast distribution tree, the router R2 that the primary multicast distribution tree has passed, R4 that does not have the capabilities for a joining attribute and related links of the routers are deleted, and a cut network topology is obtained, as shown in FIG. 7. The last-hop router R1 calculates the standby multicast distribution tree on the cut network topology, the calculation result is R1-R5-R6-R7-R0, and R1 sequentially fills in the information of <R5, R6, R7, R0> in the joining attribute of the multicast joining message sent to R5.

When the capability of a router in the network for the joining attribute changes, for example, the router that originally supports the subtype of the Explicit RPF Vector no longer supports this subtype or the router that originally does not support the subtype starts to support the subtype, recalculation of the standby multicast distribution tree will be triggered. From the border gateway protocol-link state, the controller may also learn the capability of each router in the routing area to process the subtypes of the joining attribute of the Explicit RPF Vector of the multicast joining message. The process for the controller as a centralized computing unit in the routing area to calculate a path of the multicast distribution tree for the last-hop router is the same as that of the self-calculation of the last-hop router, which will not be repeated in this embodiment.

In one implementation, a structural schematic diagram of a router that announces the capabilities for the joining attribute of the multicast joining message and establishes a multicast distribution tree is provided.

Figure 8:
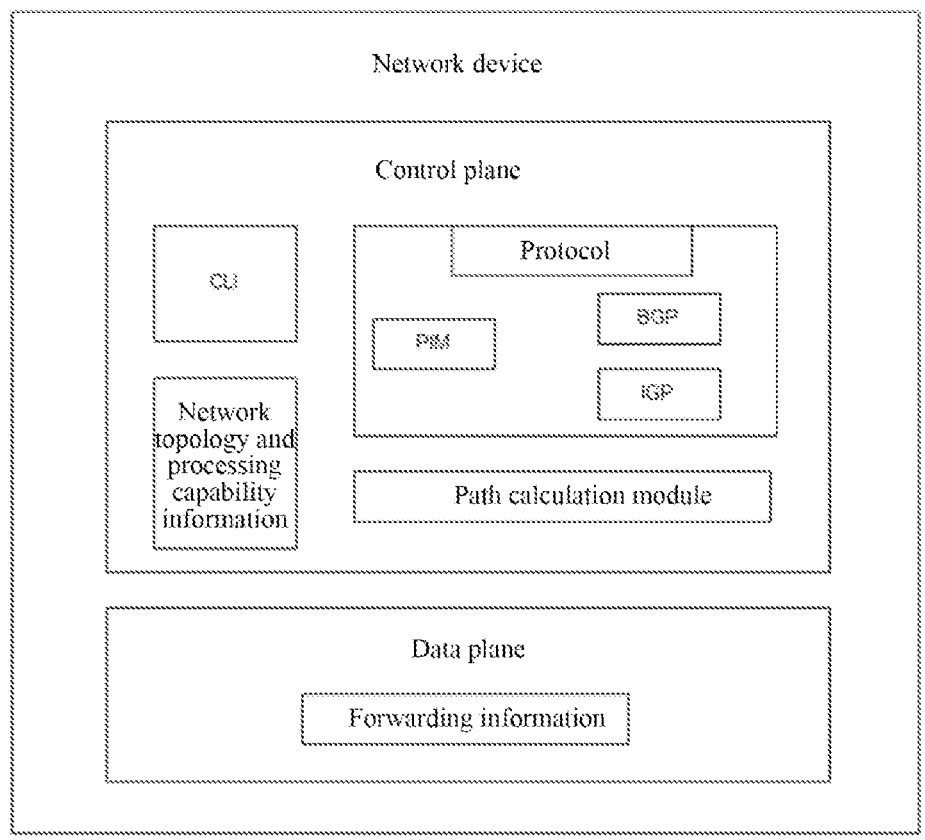
FIG. 8 is a structural schematic diagram of a router for announcing processing capabilities for a joining attribute of a multicast joining message and establishing a multicast distribution tree provided according to an embodiment of the present disclosure.

As shown in FIG. 8, a Command Line Interface (CLI) may provide a switch for processing a joining attribute of a multicast joining message for a Protocol Independent Multicast (PIM) module. Optionally, a switch of a joining attribute subtype is provided.

A link state protocol (IGP) module acquires the information about processing capability for the joining attribute of the multicast joining message from the multicast module and carries the information in the router capability information of the link state protocol.

In the border gateway protocol-link state (BGP-LS), when network layer reachability information of node type for the link state information is generated, a community attribute for describing the information about processing capabilities of the router for the join expansion attribute of the multicast joining message is added.

The router announces and receives a link state protocol message with the capability to indicate the joining attribute of the multicast joining message and network layer reachability information of the border gateway protocol-link state through a control plane, and generates network topology information with node capabilities. A calculation module calculates the upstream neighbor on the available network topology in response to a multicast demand.

Figure 9:
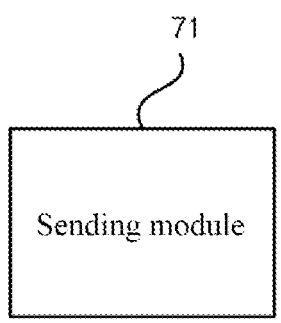
FIG. 9 is a structural schematic diagram of an apparatus for sending information provided according to an embodiment of the present disclosure.

In an embodiment, the present disclosure provides an apparatus for establishing a distribution tree. As shown in FIG. 9, the apparatus for establishing a distribution tree provided by the embodiment of the present disclosure includes a sending module 71.

The sending module 71 is configured to determine a processing capability of a present node for a joining attribute of a multicast joining message; and announce information about the processing capability for the joining attribute of the multicast joining message to a network, where the information about the processing capability for the joining attribute of the multicast joining message is configured to indicate the processing capability of the present node for the joining attribute carried in the multicast joining message.

In an embodiment, if the information about the processing capability for the joining attribute of the multicast joining message carries a processing capability identifier for the joining attribute of the multicast joining message, it is indicated that the present node has the processing capability for the joining attribute of the multicast joining message.

In an embodiment, the information about the processing capability for the joining attribute of the multicast joining message further includes a subtype of a joining attribute of a multicast joining message supported by the present node.

In an embodiment, the information about the processing capability for the joining attribute of the multicast joining message is carried in router capability information of a link state protocol (IGP), or the information about the processing capability for the joining attribute of the multicast joining message is carried in the community attribute information of information border gateway protocol-link state (BGP-LS) routing.

In an embodiment, further includes: updating the information about the processing capability for the joining attribute of the multicast joining message in the IGP and the BGP-LS when the processing capability of the present node for the multicast joining attribute changes.

In an embodiment, updating the information about the processing capability for the joining attribute of the multicast joining message includes one or more of the following: updating the processing capability identifier for the joining attribute of the multicast joining message; or updating the subtype of the joining attribute supported by the node.

The apparatus for sending information provided in this embodiment may implement the method for sending information provided in any embodiment of the present disclosure, and has corresponding functional modules and beneficial effects for implementing this method. For technical details not described in detail in this embodiment, see the method for sending information provided in any embodiment of the present disclosure.

It is worth noting that, in the above embodiment of the apparatus for sending information, the units and modules included are only divided according to the functional logic, but are not limited to the above division, as long as the corresponding functions can be implemented. In addition, the specific names of all the functional units are only for the convenience of distinguishing from each other, and are not intended to limit the protection scope of the present disclosure.

Figure 10:
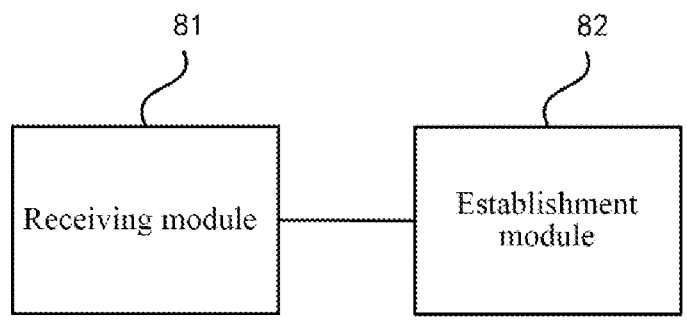
FIG. 10 is a structural schematic diagram of an apparatus for establishing a distribution tree provided according to an embodiment of the present disclosure.

In an embodiment, the present disclosure provides an apparatus for establishing a distribution tree. As shown in FIG. 10, the apparatus for establishing a distribution tree provided by the embodiment of the present disclosure includes a receiving module 81 and an establishment module 82.

The receiving module 81 is configured to receive information about processing capabilities of each node for a joining attribute of a multicast joining message.

The establishment module 82 is configured to establish a multicast distribution tree based on the information about the processing capabilities of each node for the joining attribute of the multicast joining message.

In an embodiment, the receiving information about processing capabilities of each node for a joining attribute of a multicast joining message includes: receiving information about the processing capabilities of each node for the joining attribute of the multicast joining message announced in the IGP or the BGP-LS.

In an embodiment, establishing a multicast distribution tree based on the information about the processing capabilities of each node for the joining attribute of the multicast joining message includes: retaining a node that meets a preset condition in an original network topology to form a new network topology, where the preset condition is determined by the information about the processing capability for the joining attribute of the multicast joining message; and establishing a multicast distribution tree on the new network topology.

In an embodiment, the node that meets the preset condition includes one or more of the following: a node that only has processing capability identifier for the joining attribute of the multicast joining message and do not carry any subtype; or a node that has processing capability identifier for the joining attribute of the multicast joining message and carries a subtype including a required specific subtype.

The apparatus for establishing a distribution tree provided in this embodiment may implement the method for establishing a distribution tree provided in any embodiment of the present disclosure, and has corresponding functional modules and beneficial effects for implementing this method. For technical details not described in detail in this embodiment, see the method for establishing a distribution tree provided in any embodiment of the present disclosure.

It is worth noting that, in the above embodiment of the apparatus for establishing a distribution tree, the units and modules included are only divided according to the functional logic, but are not limited to the above division, as long as the corresponding functions can be implemented. In addition, the specific names of all the functional units are only for the convenience of distinguishing from each other, and are not intended to limit the protection scope of the present disclosure.

Figure 11:
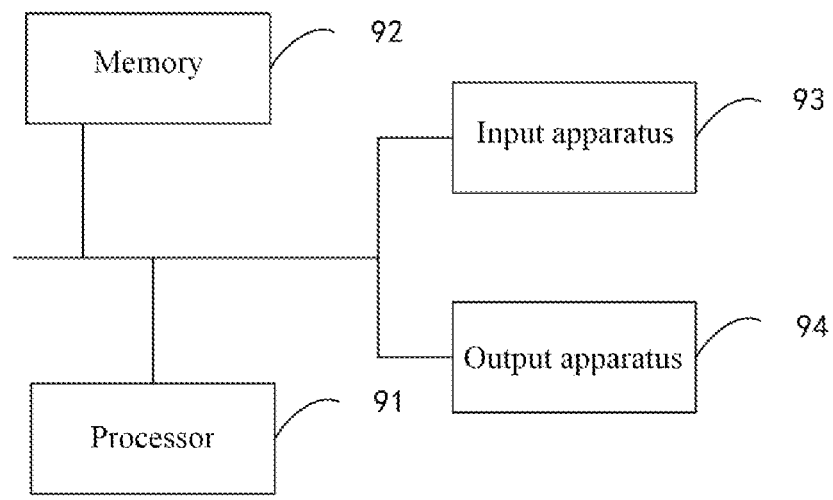
FIG. 11 is a structural schematic diagram of a device provided according to an embodiment of the present disclosure.

An embodiment of the present disclosure further provides a device. FIG. 11 is a structural schematic diagram of the device provided by the embodiment of the present disclosure. As shown in FIG. 11, the device includes a processor 91, a memory 92, an input apparatus 93 and an output apparatus 94. The processor 91 in the device may be one or more in number, and one processor 91 is taken as an example in FIG. 11. The processor 91, the memory 92, the input apparatus 93, and the output apparatus 94 of the device may be connected by a bus or other means, and the bus connection is taken as an example in FIG. 11.

As a computer readable storage medium, the memory 92 may be used to store a software program, a computer-executable program, and a module, such as a program instruction/module corresponding to the method for sending information in the embodiments of the present disclosure (for example, the sending module 71 in the apparatus for sending information), and such as the program instructions/modules corresponding to the method for establishing a distribution tree in the embodiments of the present disclosure (for example, the receiving module 81 and the establishment module 82 in the apparatus for establishing a multicast distribution tree). The processor 91 executes various functional applications of the device and processes data by running the software program, the instruction and the module stored in the memory 92, to implement any method provided by the embodiments of the present disclosure.

The memory 92 may mainly include a program storage area and a data storage area, where the program storage area may store an operating system, and an application program required for at least one function; and the storage data area may store data and the like created according to the use of the device. In addition, the memory 92 may include a high-speed random access memory, and may further include a nonvolatile memory, such as at least one magnetic disk storage device, flash memory device, or other nonvolatile solid state storage device. In some examples, the memory 92 may further include memories remotely located with respect to the processor 91, and these remote memories may be connected to the device through a network. Examples of the network include, but are not limited to, the Internet, an intranet, a local area network, a mobile communication network and combinations thereof.

The input apparatus 93 may be configured to receive input digital or character information, and generate key signal input related to user settings and function control of the device.

An embodiment of the present disclosure further provides a storage medium storing a computer-executable instruction which, when being executed by a computer processor, causes the computer processor to perform a method for sending information. The method includes: determining a processing capability of a present node for a joining attribute of a multicast joining message; and announcing information about the processing capability for the joining attribute of the multicast joining message to a network, where the information about the processing capability for the joining attribute of the multicast joining message is configured to indicate the processing capability of the present node for the joining attribute carried in the multicast joining message.

Of course, for the storage medium including a computer-executable instruction provided by the embodiment of the present disclosure, the computer-executable instruction of the storage medium is not limited to executing operations in the above method for sending information, but may also execute related operations in the method for sending information provided by any embodiment of the present disclosure.

An embodiment of the present disclosure further provides a storage medium storing a computer-executable instruction which, when being executed by a computer processor, causes the computer processor to perform a method for establishing a multicast distribution tree. The method includes: receiving information about processing capabilities of each node for a joining attribute of a multicast joining message; and establishing a multicast distribution tree based on the information about the processing capabilities of each node for the joining attribute of the multicast joining message.

Of course, for the storage medium including a computer-executable instruction provided by the embodiment of the present disclosure, the computer-executable instruction of the storage medium is not limited to executing operations in the above method for establishing a multicast distribution tree, but may also execute related operations in the method for establishing a distribution tree provided by any embodiment of the present disclosure.

Through the description of the above implementations, those having ordinary skill in the art can clearly understand that the present disclosure can be implemented with the help of software and necessary general hardware, and of course may also be implemented by hardware, but in many cases the former is a better implementation. Based on this understanding, the essence of the technical schemes of the present disclosure or the parts that make contributions to related technologies may be embodied in the form of software products, and the computer software products may be stored in a computer readable storage medium, such as a computer floppy disk, a Read-Only Memory (ROM), a Random Access Memory (RAM), a Flash Memory (FLASH), a hard disk or a CD, or the like, and may include a plurality of instructions to make a computer device (which may be a personal computer, a server, or a network device, or the like) execute the methods in various embodiments of the present disclosure.

The embodiments described above are just example embodiments of the present disclosure, and are not intended to limit the protection scope of the present disclosure.

It should be understood by those having ordinary skill in the art that the term "user terminal" covers any suitable type of wireless user node, such as a mobile phone, a portable data processing apparatus, a portable web browser or a vehicle-mounted mobile station.

In general, various embodiments of the present disclosure may be implemented in hardware or a special-purpose circuit, software, a logic, or any combination thereof. For example, some aspects may be implemented in hardware, while other aspects may be implemented in firmware or software that may be executed by a controller, a microprocessor or other computing device, although the present disclosure is not limited thereto.

Embodiments of the present disclosure may be implemented by executing a computer program instruction by a data processor of a mobile apparatus, for example, in a processor entity, or by hardware, or by a combination of software and hardware. The computer program instruction may be an assembly instruction, an instruction set architecture (ISA) instruction, a machine instruction, a machine-related instruction, microcodes, a firmware instruction, state setting data, or source codes or object codes written in any combination of one or more programming languages.

The block diagrams of any logic flow in the accompanying Drawings of the present disclosure may represent program steps, or may represent interconnected logic circuits, modules and functions, or may represent the combinations of program steps and logic circuits, modules and functions. The computer program may be stored in a memory. The memory may be of any type suitable for the local technical environment and may be implemented using any suitable data storage technology, such as but not limited to, Read Only Memory (ROM), Random Access Memory (RAM), optical memory apparatus and system (digital versatile disk DVD or CD), and the like. The computer-readable medium may include a non-transitory storage medium. The data processor may be of any type suitable for the local technical environment, such as but not limited to a general-purpose computer, a special-purpose computer, a microprocessor, a digital signal processor (DSP), an application specific integrated circuit (ASIC), a programmable logic device (FGPA) and a processor based on a multi-core processor architecture.

Detailed description of exemplary embodiments of the present disclosure is provided hereinabove by way of exemplary and non-limiting examples. However, it will be apparent to those having ordinary skill in the art that various modifications and adjustments of the above embodiments may be made without departing from the scope of the present disclosure in connection with the accompanying Drawings and Claims. Therefore, the proper scope of the present disclosure will be determined according to the Claims.

The invention claimed is:

1. A method for sending information, comprising:
   determining a processing capability of a present node for a joining attribute of a multicast joining message; and
   announcing information about the processing capability for the joining attribute of the multicast joining message to a network,
   wherein the information about the processing capability for the joining attribute of the multicast joining message is configured to indicate the processing capability of the present node for the joining attribute carried in the multicast joining message, and
   wherein the information about the processing capability for the joining attribute of the multicast joining message is carried in router capability information of a link state protocol and community attribute information of border gateway protocol-link state (BGP-LS) routing.

2. The method of claim 1, wherein in response to that the information about the processing capability for the joining attribute of the multicast joining message carries a processing capability identifier for the joining attribute of the multicast joining message, it is indicated that the present node has the processing capability for the joining attribute of the multicast joining message.

3. The method of claim 2, wherein the information about the processing capability for the joining attribute of the multicast joining message further comprises a subtype of a joining attribute of a multicast joining message supported by the present node.

4. The method of claim 1, wherein the method further comprises:
updating the information about the processing capability for the joining attribute of the multicast joining message in the link state protocol and the BGP-LS in response to that the processing capability of the present node for the multicast joining attribute changes.

5. The method of claim 4, wherein updating the information about the processing capability for the joining attribute of the multicast joining message comprises one or more of the following:
updating the processing capability identifier for the joining attribute of the multicast joining message; or updating the subtype of the joining attribute supported by the node.

6. A method for establishing a distribution tree, comprising:
receiving information about processing capabilities of each node for a joining attribute of a multicast joining message announced in a link state protocol and border gateway protocol-link state (BGP-LS), wherein the information about the processing capabilities of each node for the joining attribute of the multicast joining message is configured to indicate the processing capability of the present node for the joining attribute carried in the multicast joining message, and wherein the information about the processing capabilities of each node for the joining attribute of the multicast joining message is carried in router capability information of the link state protocol; and
establishing a multicast distribution tree based on the information about the processing capabilities of each node for the joining attribute of the multicast joining message.

7. The method of claim 6, wherein establishing a multicast distribution tree based on the information about the processing capabilities of each node for the joining attribute of the multicast joining message comprises:
retaining a node that meets a preset condition in an original network topology to form a new network topology, wherein the preset condition is determined by the information about the processing capability for the joining attribute of the multicast joining message; and
establishing a multicast distribution tree on the new network topology.

8. The method of claim 7, wherein the node that meets the preset condition comprises one or more of the following:
a node that only has processing capability identifier for the joining attribute of the multicast joining message and do not carry any subtype; or
a node that has processing capability identifier for the joining attribute of the multicast joining message and carries a subtype comprising a required specific subtype.

9. A non-transitory computer-readable storage medium storing a computer program which, when executed by a processor, causes the processor to:
perform a method for sending information, wherein the method for sending information comprises:
determining a processing capability of a present node for a joining attribute of a multicast joining message; and
announcing information about the processing capability for the joining attribute of the multicast joining message to a network, wherein the information about the processing capability for the joining attribute of the multicast joining message is configured to indicate the processing capability of the present node for the joining attribute carried in the multicast joining message, and wherein the information about the processing capability for the joining attribute of the multicast joining message is carried in router capability information of a link state protocol and community attribute information of border gateway protocol-link state (BGP-LS) routing; or
perform a method for establishing a distribution tree, wherein the method for establishing a distribution tree comprises:
receiving information about processing capabilities of each node for the joining attribute of the multicast joining message announced in the link state protocol and the BGP-LS; and
establishing a multicast distribution tree based on the information about the processing capabilities of each node for the joining attribute of the multicast joining message.

10. The non-transitory computer-readable storage medium of claim 9, wherein in response to that the information about the processing capability for the joining attribute of the multicast joining message carries a processing capability identifier for the joining attribute of the multicast joining message, it is indicated that the present node has the processing capability for the joining attribute of the multicast joining message.

11. The non-transitory computer-readable storage medium of claim 10, wherein the information about the processing capability for the joining attribute of the multicast joining message further comprises a subtype of a joining attribute of a multicast joining message supported by the present node.

12. The non-transitory computer-readable storage medium of claim 9, wherein the method for sending information further comprises:
updating the information about the processing capability for the joining attribute of the multicast joining message in the link state protocol and the BGP-LS in response to that the processing capability of the present node for the multicast joining attribute changes.

13. The non-transitory computer-readable storage medium of claim 12, wherein updating the information about the processing capability for the joining attribute of the multicast joining message comprises one or more of the following:
updating the processing capability identifier for the joining attribute of the multicast joining message; or
updating the subtype of the joining attribute supported by the node.

14. The non-transitory computer-readable storage medium of claim 9, wherein establishing a multicast distribution tree based on the information about the processing capabilities of each node for the joining attribute of the multicast joining message comprises:
retaining a node that meets a preset condition in an original network topology to form a new network topology, wherein the preset condition is determined by the information about the processing capability for the joining attribute of the multicast joining message; and
establishing a multicast distribution tree on the new network topology.

15. The non-transitory computer-readable storage medium of claim 14, wherein the node that meets the preset condition comprises one or more of the following:

a node that only has processing capability identifier for the joining attribute of the multicast joining message and do not carry any subtype; or a node that has processing capability identifier for the joining attribute of the multicast joining message and carries a subtype comprising a required specific subtype.

* * * * *